United States Patent
Deshayes et al.

(10) Patent No.: US 6,579,021 B2
(45) Date of Patent: Jun. 17, 2003

(54) POLYVALENT FRANKING MACHINE

(75) Inventors: Xavier Deshayes, Croissy (FR); Arsène Paul, Pre-St-Gervais (FR)

(73) Assignee: Neopost Industrie, Bagneux (FR)

( * ) Notice: Subject to any disclaimer, the term of this patent is extended or adjusted under 35 U.S.C. 154(b) by 0 days.

(21) Appl. No.: 09/953,196

(22) Filed: Sep. 17, 2001

(65) Prior Publication Data

US 2002/0039510 A1 Apr. 4, 2002

(30) Foreign Application Priority Data

Sep. 29, 2000 (FR) ............................... 00 12408

(51) Int. Cl.$^7$ ................................. B41J 11/26
(52) U.S. Cl. ................. 400/584; 400/104; 400/613; 400/621; 705/406
(58) Field of Search .................. 400/120.01, 613, 400/103–105, 584, 585, 621; 347/101, 108; 705/401, 406, 408

(56) References Cited

U.S. PATENT DOCUMENTS

| | | | | |
|---|---|---|---|---|
| 4,494,127 A | * | 1/1985 | King | 346/82 |
| 4,957,179 A | * | 9/1990 | Dannatt | 177/145 |
| 5,540,369 A | * | 7/1996 | Boreali et al. | 225/4 |
| 5,848,810 A | * | 12/1998 | Beaudoin et al. | 283/67 |
| 5,889,535 A | * | 3/1999 | Jackson et al. | 347/22 |
| 5,954,438 A | * | 9/1999 | Klein et al. | 400/621 |
| 6,206,292 B1 | * | 3/2001 | Robertz et al. | 235/488 |
| 6,224,280 B1 | * | 5/2001 | Buckley et al. | 400/613 |
| 6,309,119 B1 | * | 10/2001 | Buckley et al. | 400/621 |

FOREIGN PATENT DOCUMENTS

| | | |
|---|---|---|
| EP | 0718799 A2 | 6/1996 |
| EP | 0855683 A1 | 7/1998 |
| EP | 0961235 A2 | 12/1999 |
| EP | 0996084 A2 | 4/2000 |
| FR | 2713804 A | 6/1995 |
| GB | 2275668 A | 9/1994 |

* cited by examiner

*Primary Examiner*—Andrew H. Hirshfeld
*Assistant Examiner*—Dave A. Ghatt
(74) *Attorney, Agent, or Firm*—Sughrue Mion, PLLC

(57) ABSTRACT

This invention relates to a machine for franking mailpieces or labels, comprising a base and a franking module connected to this base, the base comprising first transport means for conveying the mailpieces along a mailpiece-conveying path, from a mailpiece inlet towards said franking module, and second transport means for conveying the labels along a label-conveying path, from label dispensing means towards said franking module, the dispensing means comprising at least a first delivery roll for supplying a band of self-adhesive labels of linerless type. These dispensing means preferably further comprise a second delivery roll for supplying a band of self-adhesive labels of linerless type provided with transponders.

9 Claims, 5 Drawing Sheets

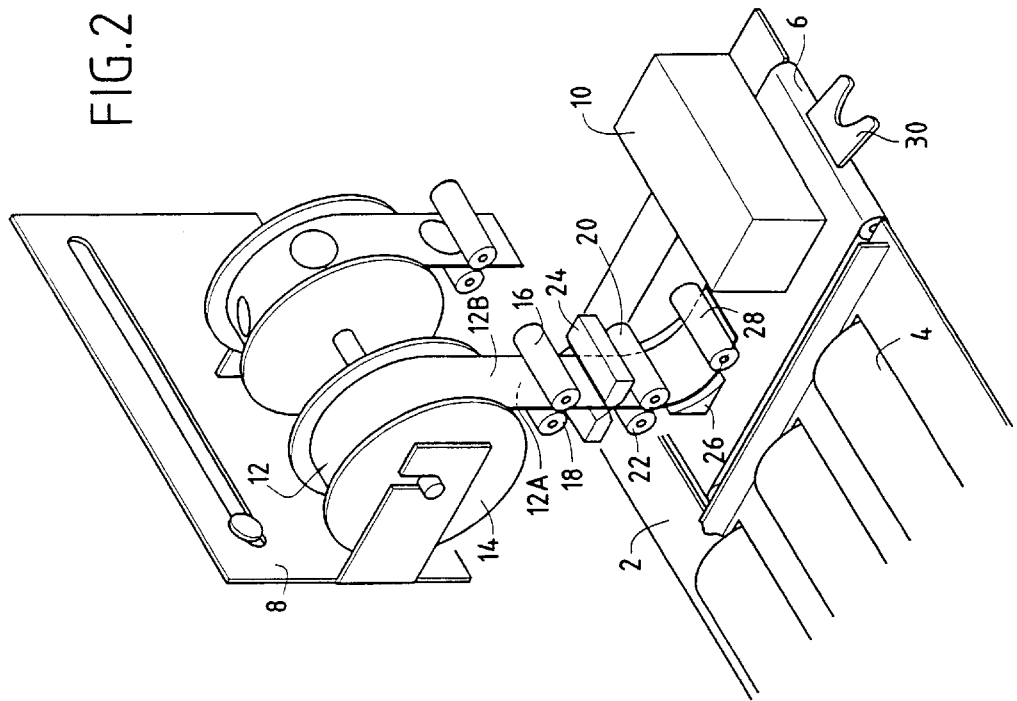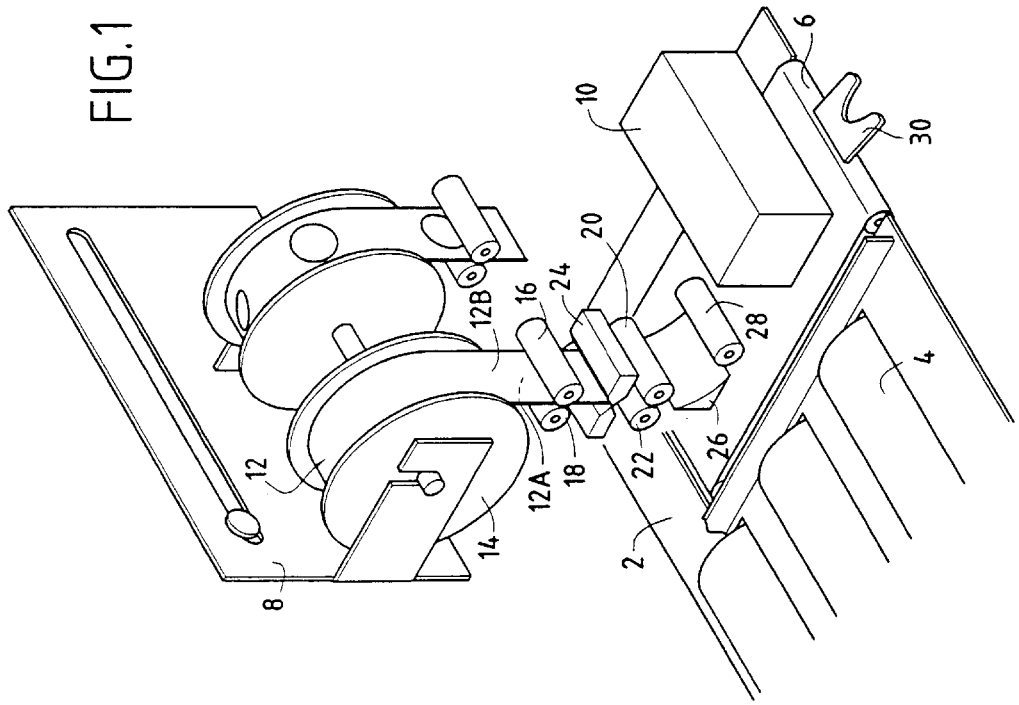

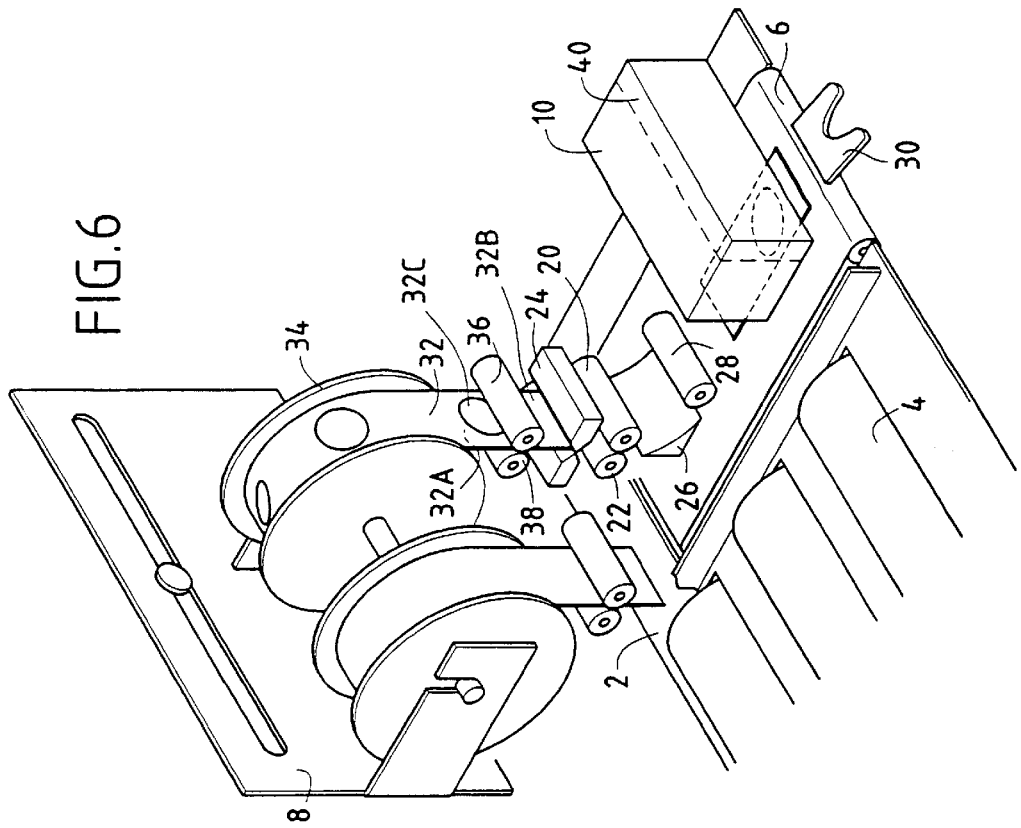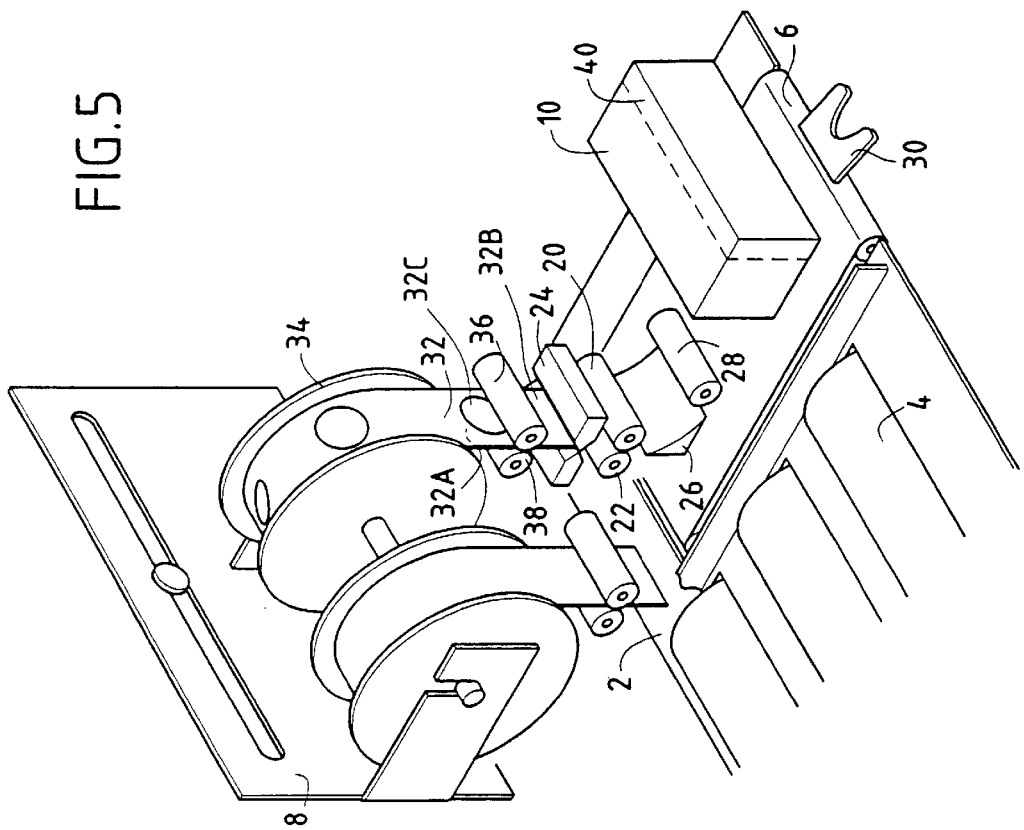

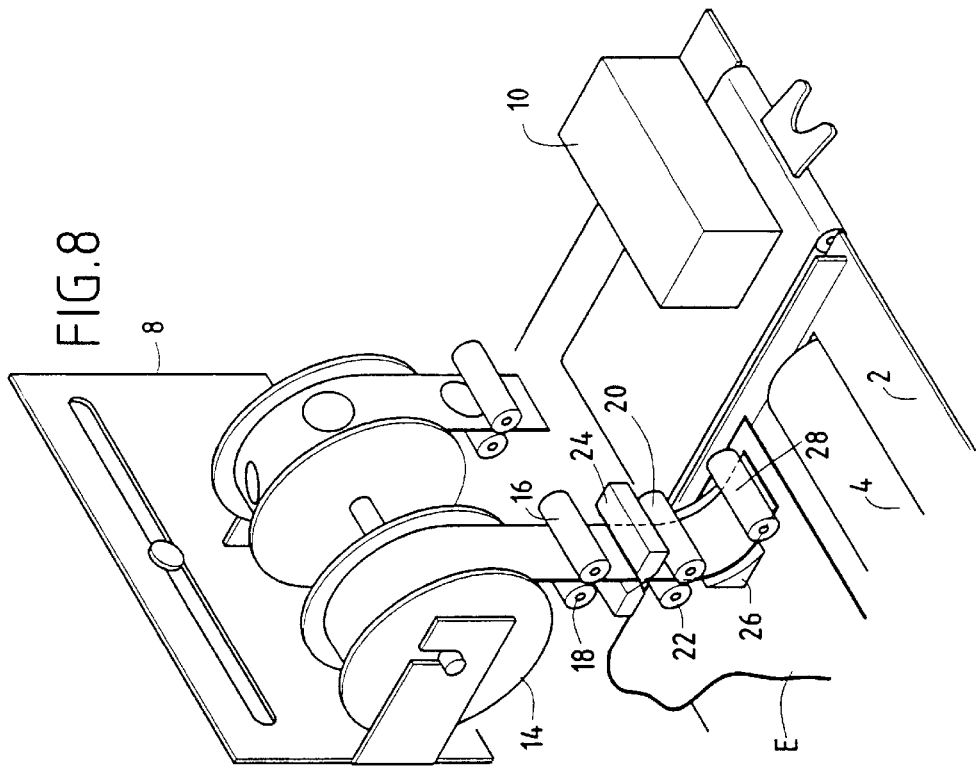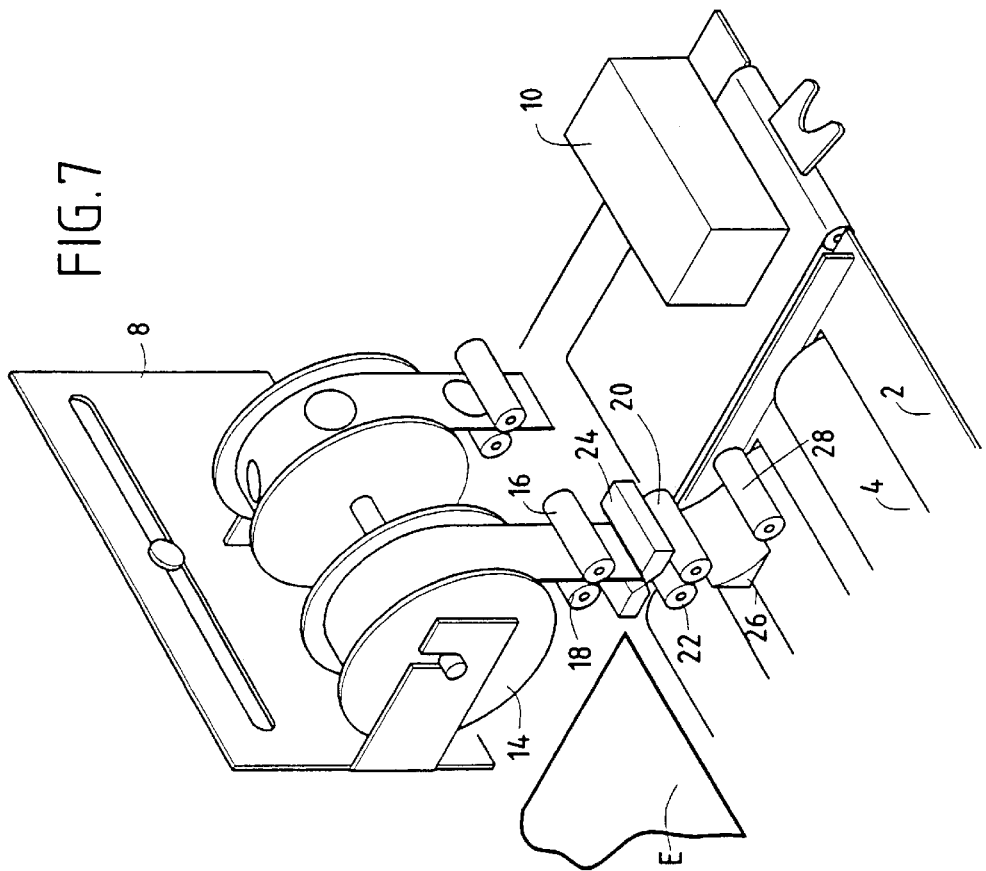

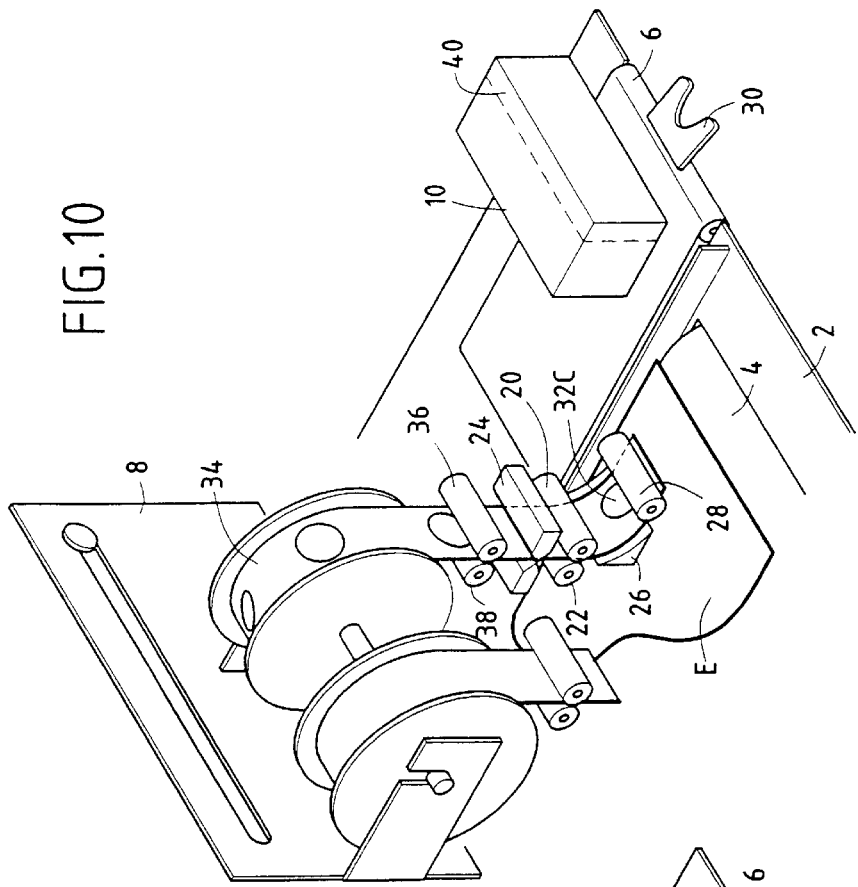
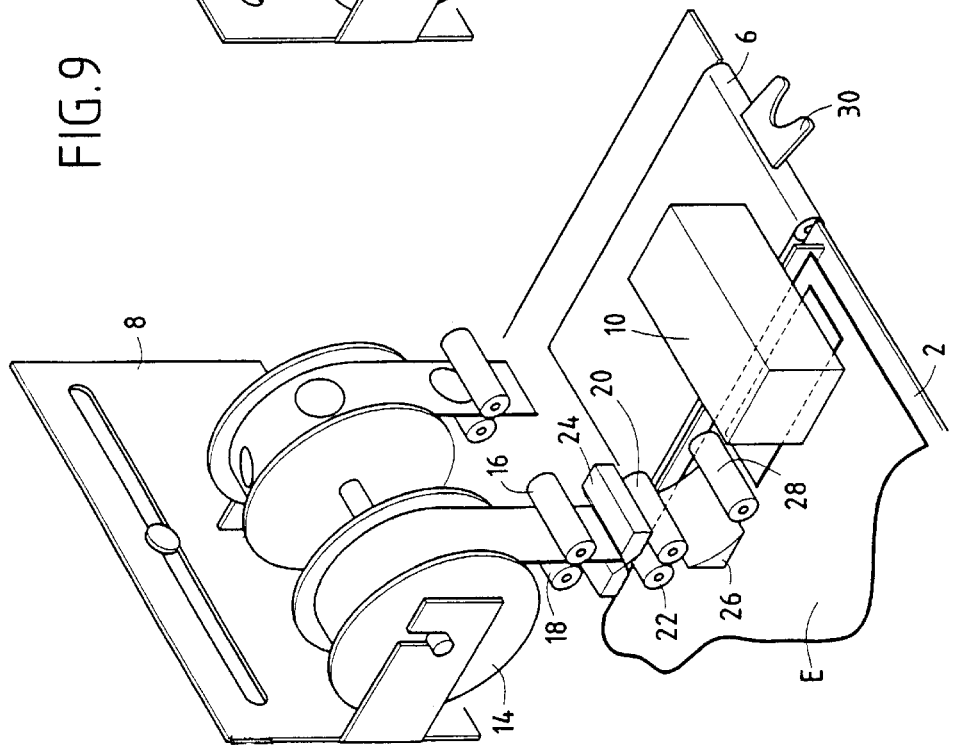

POLYVALENT FRANKING MACHINE

FIELD OF THE INVENTION

The present invention relates exclusively to the domain of mail processing and concerns more particularly a franking machine of the ink jet type adapted to print equally well mailpieces and labels.

BACKGROUND OF THE INVENTION

Franking machines of the ink jet type are well known to the person skilled in the art. They allow the franking of mailpieces of different types (envelopes, inserts, etc.) and that of labels which are to be wet and then stuck on these articles or separately.

So-called "linerless" bands have also been known for some years, which are available in the form of unwindable rolls, particularly for dispensing stamps when required (cf. for example U.S. Pat. No. 5,663,227).

However, up to the present time, no one has considered what this latter technique could contribute to the domain of mail processing and more particularly to franking machines.

It is an object of the present invention to propose a novel architecture of franking machine based on the use of this linerless technique. Another object of the invention it to increase the security of the franking data affixed to the mailpiece and to facilitate reading thereof by the Postal Administration.

SUMMARY OF THE INVENTION

These objects are attained by a machine for franking mailpieces or labels, comprising a base and a franking module connected to this base, the base comprising first transport means for conveying the mailpieces along a mailpiece-conveying path, from a mailpiece inlet towards said franking module, and second transport means for conveying the labels along a label-conveying path, from label dispensing means towards said franking module, characterized in that said dispensing means comprise at least a first delivery roll for supplying a band of self-adhesive labels of linerless type.

This novel architecture of franking machine employing self-adhesive bands proves particularly advantageous as it avoids the presence of water within the machine, i.e. it avoids the presence of water in an electrical environment.

The dispensing means further comprise a second delivery roll for supplying a band of self-adhesive labels of linerless type provided with transponders. They are mobile in translation perpendicularly to the mailpiece-and label-conveying paths so as to define at least three franking positions. Similarly, the franking module is mobile in translation perpendicularly to the mailpiece-conveying path so as to define at least two franking positions.

According to an advantageous embodiment, the franking module further comprises a third franking position for printing postal or non-postal data other than the franking data. This franking module may preferably comprise both an ink jet printing module and a contactless writing module.

The band of self-adhesive labels is preferably driven by two pairs of upstream and downstream rollers between which is arranged a cutting device of the severing type intended to sever a taut band to a length determined by a detector device. The rollers disposed on the outer face side of the band are motorized, the other two rollers acting as presser rollers and disposed on the inner face side of the band being mounted idle and coated with a hardly adherent material in order to avoid the band of labels sticking on these rollers.

The franking machine further comprises, arranged successively at the outlet of said downstream rollers, a curved guiding wedge for deviating the path of the band and another presser roller for applying the band against said label-conveying means or against said mailpieces supported by said mailpiece-conveying means. In order to avoid the band of labels sticking, the curved guiding wedge and said label-conveying means are coated with a non-adherent material.

BRIEF DESCRIPTION OF THE DRAWINGS

The invention will be more readily understood on reading the following description given by way of indicative and non-limiting example, with reference to the accompanying drawings, in which:

FIG. 1 is a partial view of a franking machine according to the invention in a first position of printing of a label.

FIG. 2 is a partial view of a franking machine according to the invention in a second position of printing of a label.

FIG. 5 is a partial view of a franking machine according to the invention in a first position of writing of a label.

FIG. 6 is a partial view of a franking machine according to the invention in a second position of writing of a label.

FIG. 7 is a partial view of a franking machine according to the invention in a first position of printing of an envelope.

FIG. 8 is a partial view of a franking machine according to the invention in a second position of printing of an envelope.

FIG. 9 is a partial view of a franking machine according to the invention in a third position of printing of an envelope, and FIG. 10 is a partial view of a franking machine according to the invention in a first position of writing of an envelope.

DESCRIPTION OF PREFERRED EMBODIMENTS

Figure 4:
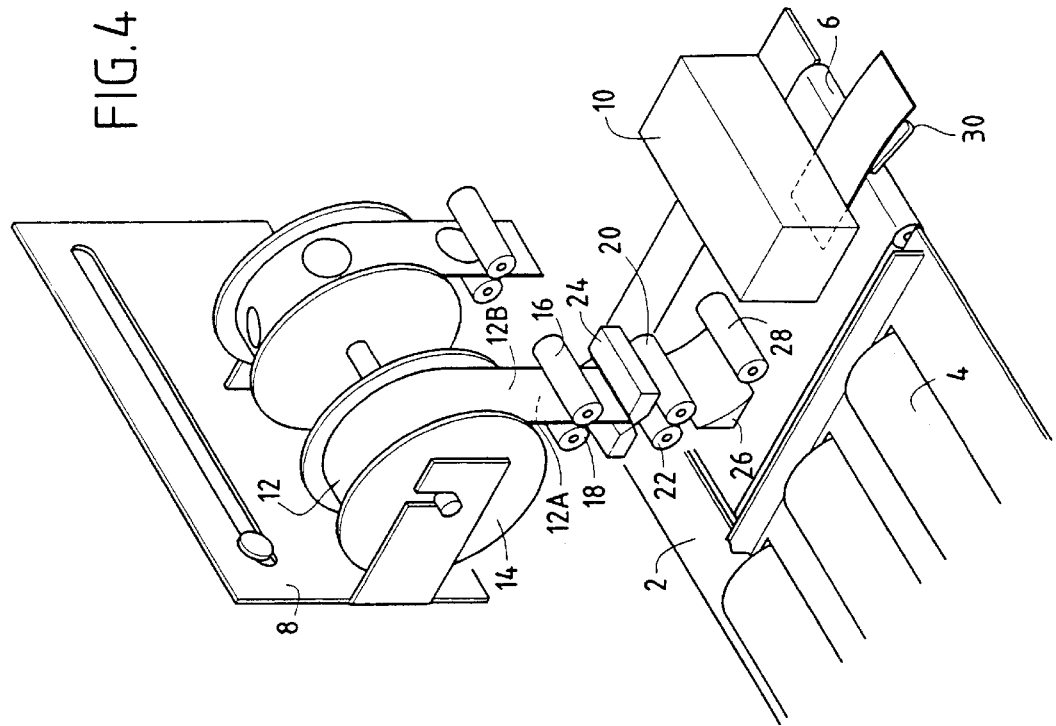
FIG. 4 is a partial view of a franking machine according to the invention in a fourth position of printing of a label.

A franking machine is conventionally formed by a base and a franking module connected to this base. The base comprises transport means (rollers or belt) for conveying the mailpieces through the machine from a mailpiece inlet along a mailpiece-conveying path, means for metering the frankings effected (in particular ascending and descending registers), data and franking-type input means (through a user interface, for example), and possibly means for recharging a franking credit (by downloading or specific module). Optionally, the base may also comprise a device for dispensing and conveying labels through the machine. The label-conveying path may correspond, partly or not, to the mailpiece-conveying path. The franking module preferably comprises a plurality of franking heads (each comprising in the ink jet technology one or more rows of ejection nozzles depending on the dimensions to be printed) and at least memory means for storing in particular the operational parameters of these heads. Other printing technologies may of course also be envisaged (ink transfer, thermal transfer, . . . ), possibly with a principal printing assembly associated with a secondary printing assembly. The franking module may be of conventional type (therefore rechargeable by the Postal Administration) or of disposable type, in that case connected to the base by a connection of secured type.

Referring now to the drawings, FIG. 1 schematically shows very partially (limited to the printing zone), a franking machine according to the invention, comprising the base 2 with its mailpiece- and label-conveying means 4, 6. These labels are delivered by a label dispenser 8 fast with the base. A franking module constituted by an ink jet printing module 10 is, of course, also provided for printing the franking data (postal indicia) on the labels or the mailpieces. This printing module may also serve to print on the mailpieces all the other postal or non-postal data necessary for dispatch (address for distribution), valorisation (any information or advertizing message for example), sorting (bar code), follow-up (nature of the conveyor) and the monitoring of these articles. The mailpiece feed module and the means for generally controlling the machine, which are well known to the person skilled in the art, will not be described nor shown, although they are necessarily present.

According to the invention, this franking machine is provided with a dispenser of self-adhesive labels of the linerless type, i.e. labels not presenting a silicone-coated film for detachment). These labels 12, which present an adhesive inner face 12A and a non-adhesive outer face 12B, may be delivered in a band, continuous or pre-cut out, from a first delivery roll 14, the adhesive face being intended to be stuck, automatically or manually (case of postal parcels for example) on the mailpiece to be dispatched, and the non-adhesive face being intended to be directly printed by the printing head 10. Of course, this non-adhesive face 12B must be compatible with an ink jet printing.

The band of linerless labels is driven by two pairs of upstream rollers 16, 18 and downstream rollers 20, 22, between which is arranged a cutting device 24 of the severing type. The cutting device is positioned between the two pairs of rollers in order to be able to sever a taut band to a well-determined length conventionally controlled by a detector device (not shown) such as a coder or a mechanical or optical position sensor mounted for example on the roll 14.

The rollers 16, 20 arranged on the outer face side of the band are motorized and controlled by a motor (not shown), the other two rollers 18, 22 acting as presser rollers and arranged on the inner face side of the band being mounted idle and coated with a hardly adherent material (silicone or Teflon® film, for example) in order to avoid the band sticking on these rollers. At the outlet of the rollers, there are successively arranged a curved guiding wedge 26 for deviating the path of the band and another presser roller 28 intended thereafter to apply the band on the endless belt 6 likewise motorized by the motor.

Like the first and second presser rollers 18, 22, the curved guiding wedge 26 and the endless belt 6 are coated with a non-adherent material. All these elements are, of course, mounted in the base and fixed thereto in manner known per se, and therefore do not need to be described.

Figure 3:
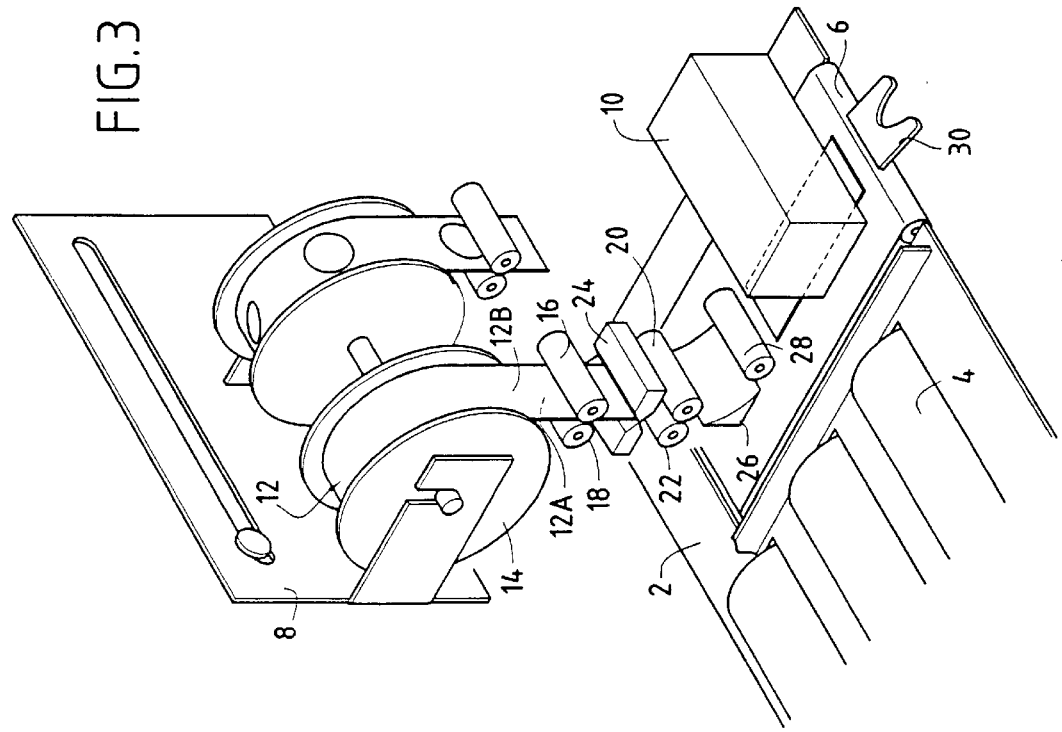
FIG. 3 is a partial view of a franking machine according to the invention in a third position of printing of a label.

FIGS. 2 to 4 illustrate the operation of the franking machine according to the invention when printing labels intended to be applied manually on postal parcels.

In FIG. 2, the band of linerless labels 12 has been unwound from the delivery roll 14 by a determined length corresponding to the desired cut. It will be noted that the curved guiding wedge 26 deviates the band towards the third presser roller 28 which will apply it against the endless belt 6. The continuous movement of the endless belt associated with the action of this presser roller will hold the severed label against the belt with a sufficient adherence to allow quality printing at the level of the printing module 10 thereafter (cf. FIG. 3). Such printing is effected without the belt 6 stopping. Once printing has been effected, the label is brought into the position of FIG. 4 where the user can grip it and stick it on the postal parcel for which it is intended (such gripping being facilitated, on the one hand, by a support 30 fast with the base and, on the other hand, by the free wheel operation of the belt in this position of grip).

FIG. 5 illustrates a second embodiment of the franking machine according to the invention in which the label dispenser 8, mounted to move in translation on the base 2, comprises a second roll 34 for delivering self-adhesive labels 32 incorporating a transponder. Such special linerless labels are known from U.S. Pat. No. 6,019,865. They comprise an adhesive inner face 32A and a non-adhesive outer face 32B. They are delivered in a continuous band, the adhesive face being intended to be stuck automatically or manually (case of postal parcels, for example) on the mailpiece to be dispatched. Between the two faces of this label 32 is mounted an electronic microcircuit 32C with memory called "transponder" and which is intended to receive at least the franking data usually present on the postal indicia of the mailpiece to be dispatched.

As for the previous embodiment, the band of self-adhesive labels is driven by two pairs of upstream and downstream rollers between which is arranged a cutting device of the severing type. The cutting device 24 and the downstream rollers 20, 22 are advantageously those used with the first delivery roll 14, upstream rollers 36, 38 mobile in translation with the dispenser being arranged just at the outlet of the delivery roll 34. Similarly, as before, the curved guiding wedge 26 for deviating the path of the band and the third presser roller 28 are successively arranged at the outlet of said two pairs of rollers.

The position of franking of this second embodiment is illustrated in FIG. 6. Here, it is a position of writing in the transponder 32C. This writing in the memory (of RAM or EEPROM type) of the electronic microcircuit is effected remotely (without contact) through a writing module 40 instead of the afore-mentioned printing module 10. This contactless writing is also effected without the belt stopping. These two printing and writing modules may, of course, and as illustrated, preferably cohabit side by side in the printing zone. Once the writing procedure (and possibly the reading one associated therewith) in the microcircuit is finished, the label is advanced on the support 30 to be gripped by the user.

These procedures of printing or writing on a linerless label with or without transponder may, of course, also be automatically applied on a mailpiece. FIGS. 7 to 9 and 10 respectively illustrate these two variant embodiments.

In FIG. 7, linerless labels are unwound from the first delivery roll 14 and are guided towards a mailpiece, for example an envelope E, by the two pairs of upstream rollers 16, 18 and downstream rollers 20, 22 between which is arranged the cutting device 24 of the severing type. To that end, the cutting device and the downstream rollers are rendered mobile in translation perpendicularly to the displacement of the envelope so as to occupy an adequate position with respect to this envelope.

In the position of FIG. 8, the roll has been unwound by a determined length and the envelope has advanced by a corresponding distance in order to receive the front end of this label which is in that case directly stuck on the envelope by the third presser roller 28 (and without any water supplied by any wetting means). The presence of a wetting device is dispensed with, this constituting a decisive advantage for technical and economic reasons. In FIG. 9, the label in position beneath the printing module 10 (which will have been previously displaced in translation from its initial position for printing labels) has been severed and is now entirely stuck on the envelope which is then ready to be directed towards a module outside the franking machine, for example a storage module.

Finally, FIG. 10 illustrates a variant embodiment of the franking machine corresponding to the writing of franking data in the microcircuit 32C of a linerless label incorporating a transponder delivered by the second roll 34 and intended to be automatically stuck on a mailpiece, for example an envelope E. With respect to the previous configuration, the fresh transverse displacement of the dispenser 6 to bring the second roll 34 on the mailpiece-conveying path will be noted.

In this way, the dispenser can occupy three distinct positions traversely to the direction of displacement of the mailpieces, allowing it to perform the four preceding functions:

- in a first position (FIG. 1), it allows only the printing of linerless labels alone,
- in a second position, it allows either the writing on linerless labels provided with a transponder (FIG. 5) or the printing of linerless labels stuck on mailpieces (FIG. 7),
- in a third position (FIG. 10), it allows the writing on linerless labels provided with a transponder and stuck on mailpieces, With this polyvalent dispensing of the labels, the franking machine of the invention may effect frankings in different manners:

- by conventionally printing postal indicia containing all the data that can be envisaged,
- by producing printed labels containing various franking data, ready to be stuck manually on parcels or large envelopes,
- by producing labels similar to the preceding ones, but provided with a transponder in which all the franking data are recorded and likewise ready for use,
- by automatically sticking one or the other of these two types of linerless labels on the envelopes before the franking phase (printing or writing).

What is claimed is:

1. Machine for franking mailpieces or labels, comprising a base and a franking module connected to this base, the base comprising first transport means for conveying the mailpieces along a mailpiece-conveying path, from a mailpiece inlet towards said franking module, and second transport means for conveying the labels along a label-conveying path, from label dispensing means towards said franking module, wherein said dispensing means comprise at least a first delivery roll for supplying a band of self-adhesive labels of linerless type, wherein said dispensing means are mobile in translation perpendicularly to the mailpiece- and label-conveying paths so as to define at least three positions of franking.

2. The franking machine of claim 1, wherein said dispensing means further comprise a second delivery roll for supplying a band of self-adhesive labels of linerless type provided with transponders.

3. The franking machine of claim 1 or claim 2, wherein said franking module is mobile in translation perpendicularly to the mailpiece-conveying path so as to define at least two positions of franking.

4. The franking machine of claim 3, wherein said franking module further comprises a third position of franking for printing postal or non-postal indicia other than the franking data.

5. The franking machine of claim 1 or claim 2, wherein said franking module comprises both an ink jet printing modules and a contactless writing module.

6. The franking machine of claim 1 or claim 2, wherein said band of self-adhesive labels is driven by two pairs of upstream and downstream rollers, between which is arranged a cutting device of the severing type intended to sever a taut band to a length determined by a detector.

7. The franking machine of claim 6, wherein the rollers arranged on the outer face side of the band are motorized, the other rollers acting as presser rollers and disposed on the inner face side of the band being mounted idle and coated with a hardly adherent material in order to avoid the band of labels sticking on these rollers.

8. The franking machine of claim 6, wherein it further comprises, arranged successively at the outlet of said downstream rollers, a curved guiding wedge for deviating the path of the band and another presser roller for applying the band against said label-conveying means or against said mailpieces supported by said mailpiece-conveying means.

9. The franking machine of claim 8, wherein said curved guiding wedge and said label-conveying means are coated with a non-adherent material.

* * * * *